United States Patent [19]
Yukawa

[11] 3,879,709
[45] Apr. 22, 1975

[54] LOCKING SYSTEM USING RADIO WAVE

[76] Inventor: Hiroyuki Yukawa, No. 104, Aza Naeshiro, Oaza Obata, Moriyama-ku, Nagoya-shi, Aichi-ken, Japan

[22] Filed: Aug. 9, 1972

[21] Appl. No.: 279,261

Related U.S. Application Data

[63] Continuation-in-part of Ser. No. 50,399, June 29, 1970, abandoned.

[30] Foreign Application Priority Data

July 1, 1969 Japan .................. 44-52389
July 21, 1969 Japan .................. 44-57478

[52] U.S. Cl. .......... 340/171 R; 340/171 A; 343/225
[51] Int. Cl. .................. H04q 7/00
[58] Field of Search .......... 340/171 R, 171 A, 310; 325/393, 394; 343/225, 228

[56] References Cited

UNITED STATES PATENTS

| | | | |
|---|---|---|---|
| 2,524,782 | 10/1950 | Ferrar | 340/171 PF |
| 2,547,023 | 4/1951 | Lense | 340/171 PF |
| 3,564,501 | 2/1971 | Flook | 340/171 R |

*Primary Examiner*—Harold I. Pitts
*Attorney, Agent, or Firm*—Wenderoth, Lind & Ponack

[57] ABSTRACT

A locking system using radio waves. The system is made up of a transmitting means having a low frequency oscillation circuit with a mechanical filter circuit and an instantaneous starting circuit, an amplification circuit, a half-wave rectifying and a rectangular wave rectifying circuit for a low frequency generated by said low frequency oscillation circuit, and a high frequency oscillation circuit operated interruptedly by a rectified rectangular wave from said half-wave rectifying and rectangular wave rectifying circuit. A receiving means receives electric wave energy radiated from said transmitting means, said receiving means including a frequency detection circuit with a filter circuit to permit a narrow range of high frequency and low frequency to pass, and a mechanical filter circuit having a peak value forming circuit for amplifying and attenuating a peak value of the detected output from said frequency detection circuit to make the value of said detected output constant. The lastmentioned mechanical filter circuit further has an integral circuit. The output signal for operating a locking mechanism is obtained through a rectifying circuit for the output of the lastmentioned filter circuit and a DC amplication circuit with a delay circuit.

2 Claims, 9 Drawing Figures

LOCKING SYSTEM USING RADIO WAVE

REFERENCE TO RELATED APPLICATION

This is a continuation-in-part applicatiion of Ser. No. 50,399 filed June 29, 1970 now abandoned.

BACKGROUND OF THE INVENTION

1. Field of the Invention

The present invention relates to a locking system using electric wave, more particularly to a locking system comprising a transmitter which can transmit a constant frequency without being influenced by the temperature by applying a mechanical filter of high precision, and a receiver having a circuit constructed not to be operated by any electric wave other than that of said transmitter and to be responsive only to the electric wave from the transmitter of the present invention.

2. Description of the Prior Art

Many types of locks which have been utilized broadly heretofore are those which are locked and unlocked by inserting key therein, or by a combination of numerals on the dial thereof, but with a key type lock, when locking or unlocking, turning operation is required after inserting key therein, and with a combination type, combination numerals for the dial must be remembered to operate the dial, and in this connection, both cannot be unlocked without touching directly to the lock and therefore unlocking operation thereof is troublesome.

SUMMARY OF THE INVENTION

A first object of the present invention is to provide a locking system making use of electric wave, which is feasible to perform unlocking simply by operating the switch of a transmitter carried, in the course of approaching to the lock, for eliminating various drawbacks of such conventional locks.

A second object of the present invention is to provide a system intended to improve the performance of the transmitter and the receiver by adopting a mechanical filter having high precision to avoid the influence by temperature variation and the like on the frequency.

A third object of the present invention is to provide a system to separate perfectly adjacent frequencies by a filter circuit of a narrow range provided on the receiver and thereby increasing the number of combinations of frequency serving as a key.

These and other objects can be accomplished by the parts, combinations and operations, constructing the present invention, a preferred embodiment of which is shown by way of an example in the accompanying drawings and hereinafter described in detail.

DETAILED DESCRIPTION OF THE PREFERRED EMBODIMENTS

Figure 1:
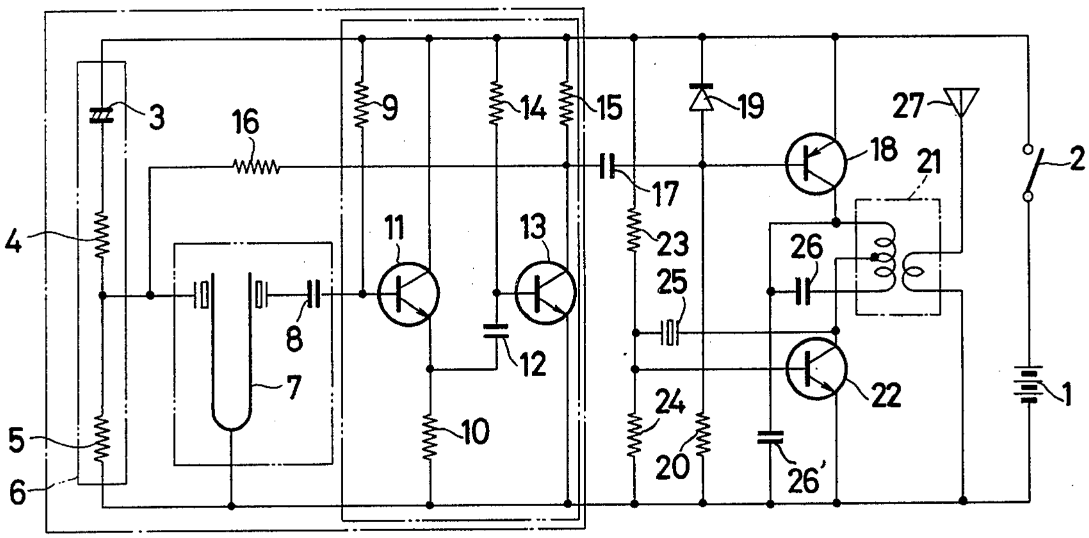
FIG. 1 is a circuit diagram showing the detailed structure of the transmitter according to the present invention.

Initially, the construction of the transmitter according to the present invention will be explained with reference to FIG. 1. The input end of a mechanical filter 7 is connected between resistors 4 and 5 of an instantaneous starting circuit 6 wherein a condenser 3 and the pair of the resistors 4, 5 are connected in series from a power source 1 through a switch 2. Thereby, mechanical filter 7 starts instantaneously when the switch 2 is closed.

And, in the output side of the mechanical filter 7 a condenser 8 is interposed in series, said output side being connected with a first amplifying section comprising a transistor 11 including a base with a bias resistor 9, an emitter with an emitter resistor 10 and a collector. The output of the mechanical filter is input to said base of the transistor 11. The output of said first amplifying section is put through a condenser 12 into a second amplifying section comprising a transistor 13 including a base with a bias resistor 14, a collector with a collector resistor 15 and an emitter which is earthed. The emitter of the transistor 11 is thus connected with said base of the transistor 13 through said condenser 12.

A portion of the amplified output generated at both ends of the resistor 15 is fed back partially to the input side of said mechanical filter 7 through a resistor 16.

The output potential at both ends of the collector resistor 15 of said transistor 13 is fed to a base side of a transistor 18 through a condenser 17.

The base of the transistor 18 is also connected to a half wave rectifying diode 19 and a bias resistor 20, and the collector thereof is connected with a collector of a transistor 22 through a primary of a coil 21. The base of the transistor 22 is biased through resistors 23 and 24, and the base and collector thereof are bridged with a crystal oscillator 25 and the emitter thereof is earthed.

In addition, condensers 26, 26′ are connected to the primary side of the coil 21, thereby forming a tank circuit and a high frequency oscillating section together with said crystal oscillator 25.

At the secondary side of the coil 21 is provided an antenna 27 for radiating electric wave energy. This completes the transmitter construction.

Figure 5:
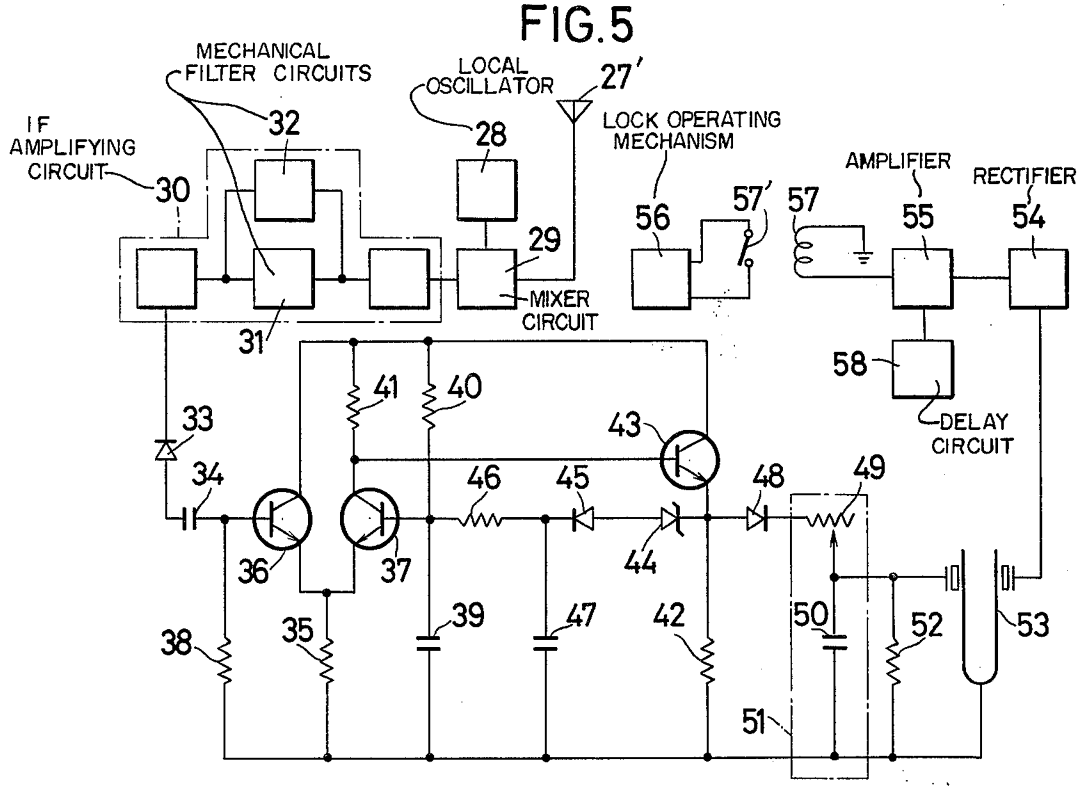
FIG. 5 is a circuit diagram showing the correlation between the construction of the receiver according to the present invention and the operating circuit for the locking mechanism.

Now, the receiver will be explained. As shown in FIG. 5, electric wave energy received from a receiving antenna 27′ is put into a mixer circuit 29 having an usual local oscillator circuit 28, the output of which is applied to an intermediate frequency amplifying circuit 30.

Between the intermediate frequency amplifying circuit 30 and the mixer circuit, mechanical filter circuits 31, 32 are positioned to pass the intermediate frequency signal and a signal having a frequency obtained by adding low frequency to the intermediate frequency or substracting low frequency therefrom. The mechanical filter circuits 31, 32 are constructed to select respective frequencies of considerably narrow range and to prevent other frequencies from passing therethrough.

Following the intermediate frequency amplifying circuit 30, a detector diode 33 and a condenser 34 are provided in series and connected to the base of a transistor 36. The transistor 36 and a transistor 37 are earthed commonly through an emitter resistor 35.

At the base side of the transistor 36 is provided a resistor 38, and further, between the base of the transistor 37 and the earth is provided a condenser 39. Between the base of transistor 37 and a power source a resistor 40 is provided, and between the collector thereof and the power source a resistor 41 is interposed.

The collector of the transistor 37 is connected to the base of a transistor 43 which is provided with an emitter resistor 42.

Between the emitter of the transistor 43 and the base of said transistor 37 are connected a zener diode 44, a diode 45 and a resistor 46, and the junction of the diode 45 and the resistor 46 are earthed through a condenser 47. Between both ends of said resistor 42 is constructed an integral circuit 51 comprising a variable resistor 49 and a condenser 50, said resistor 42 being connected with said integral circuit 51 through a diode 48. The integral circuit 51 is connected with a mechanical filter 53 having a discharge resistor 52, the output of said mechanical filter being adapted to have a predetermined potential.

Thus, the whole receiver is constructed.

Further, a rectifier 54 and a DC amplification circuit 55 are provided at the output side of said receiver, said circuit 55 being connected to an operation relay 57 of a lock operating mechanism 56. And, in said DC amplification circuit 55 is incorporated a delay circuit 58 imparting a delay to the relay 57.

Figure 9:
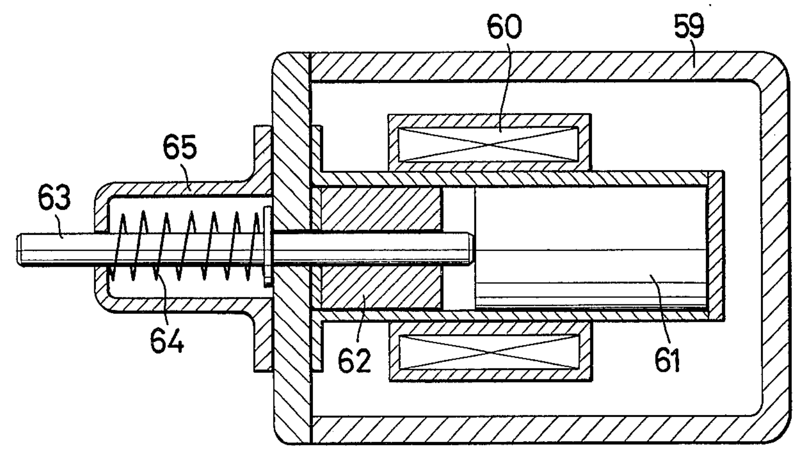
FIG. 9 is a longitudinally sectioned side view of an embodiment of the locking mechanism.

Now, an embodiment of the lock operating mechanism will be described. As shown in FIG. 9, said mechanism comprises a housing 59, a solenoid 60, a plunger 61, a fixed iron core 62, a slidable lock rod 63, a spring 64 for returning back said rod 63 to its initial position, and a case 65 for said spring 64. One end of said rod is in contacted with said plunger 61 and the other end thereof extends outside of said case 65.

Figure 2:
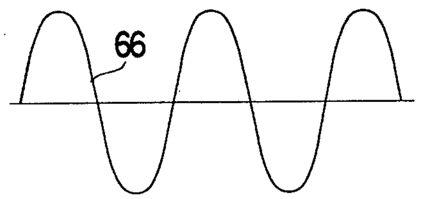
FIG. 2 is a wave form diagram of low frequency to be oscillated in the circuit diagram in FIG. 1.

The process of operations from the transmitter through the receiver to the lock operating mechanism, all constructed as above mentioned, will now be explained. When the switch is turned on, the condenser 3 is charged with the potential from the power source 1 through the resistors 4, 5. As the resistor 5 has a higher resistance value than the resistor 4, a higher voltage is applied to the input side of the filter 7 and the mechanical filter 7 is started instantaneously. The electric oscillation of the mechanical filter 7 is applied to the base of the transistor 11 through the condenser 8, and amplification is carried out by the transistor 11. The amplified transistor output is sent to the base of the next transistor 13 through the condenser 12, and further amplification is performed by the second transistor. A part of the output at both ends of the collector resistor 15 of the transistor 13 is fed back to the input side of said mechanical filter 7 through the resistor 16 and the filter 7 remains in an oscillating mode. The output electric potential at both ends of the collector resistor 15 is applied to the base of the transistor 18 through the condenser 17 as a low frequency a sine wavelike waveform 66 shown in FIG. 2.

Figure 3:
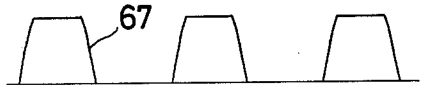
FIG. 3 is a wave form diagram of the rectangular wave rectified into a half wave in the circuit diagram in FIG. 1.

Accordingly, when the base current of the transistor 18 reaches a saturation level, the half-wave current rectified by the diode 19 flows from the transistor 18 to the collector of the transistor 22 through the primary coil of the coil 21 with a form similar to the rectangular wave of the wave form 67 shown in FIG. 3.

Then, when the current of the wave form shown by the wave form 67 is applied to the transistor 22, an oscillation of high frequency specified by the crystal oscillator 25 and the tank circuit consisting of the primary coil of the coil 21 and the condenser 26 is generated. The high frequency electric power generated at this time is smaller than that controlled with the transistor 18, subsequently, it is to be radiated as an electric wave energy into the air from the antenna 27 through the secondary coil of the coil 21.

Figure 6:
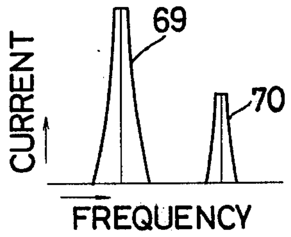
FIG. 6 is a wave form diagram showing an example of frequency of narrow range after having passed through the filter of the circuit in the receiver shown in FIG. 5.
Figure 4:
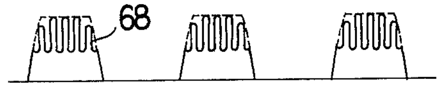
FIG. 4 is a wave form diagram of the electric wave energy radiated from the transmitter in FIG. 1.

The electric wave energy in this case is an interrupted wave of high frequency controlled by the wave of low frequency like the wave form 68 in FIG. 4. The electric wave energy radiated from the transmitting antenna 27 is received by the receiving antenna 27' and imparted to the intermediate frequency amplification circuit 30 from the mixer circuit 29 having the local oscillation circuit 28. The mechanical filter 31 provided in the intermediate frequency amplification circuit 30 performs high frequency detection within a narrow range, and all other electric waves without the narrow range are eliminated perfectly; similarly mechanical filter 32 performs low frequency detection, whereby the wave form as shown 69 or 70 of FIG. 6 can be obtained.

Then, the electric potential from the intermediate frequency amplification circuit 30 is detected by the diode 33 and applied into the base of the transistor 36 through the condenser 34. Accordingly, the emitter bias of the transistor 36 becomes an emitter current by flowing a base current to the base of the transistor 37 through the resistor 40. And, the transistor 37 is earthed like alternating current through the condenser 39 and amplifies with base earth system.

Then, the input signal current-amplified by the transistor 36 is voltage-amplified by the transistor 37 to generate an output at both ends of the resistor 41 coupled to the collector of the transistor 37.

Figure 7:
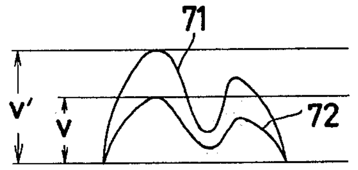
FIG. 7 is a wave form diagram showing an example of comparison of the state controlled to a fixed peak value in the circuit of the receiver in FIG. 5.

Said output is imparted to the base of the transistor 43 as the input signal, and after being amplified by the transistor 43, an output is generated at both ends of the resistor 42 connected to the emitter side of the transistor 43. In this case, assuming that the output has a peak value $v'$ as the wave form 71 shown in FIG. 7, the condenser 47 is charged through the diode 45 with a voltage over the zener set voltage of the zener diode 44, and thus the base of the transistor 37 is charged. Thereafter the base voltage of the transistor 37 is increased, and the output voltage at both ends of the resistor 41 is lowered, the output generated at both ends of said resistor 42 being automatically controlled OO so as not to exceed the zener voltage of the zener diode 44. That is, it is limited to a voltage having peak value $v$ as the wave form 72 shown in FIG. 7.

There attenuating and amplifying actions are to be held during a time period when the condenser 47 is charged or discharged through the resistor 46 with respect to the base of the transistor 37.

Figure 8:
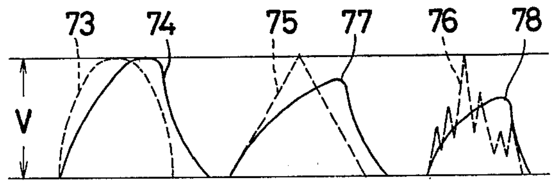
FIG. 8 is a wave form diagram showing an example of the output of the receiver shown in FIG. 5.

Accordingly, as above mentioned, when the output voltage having a peak value *v* is generated between both ends of the resistor 42, it is half-wave rectified by the diode 48 to be formed into a wave form 73 with a potential V as shown in FIG. 8, which coincides with the operating potential of the following mechanical filter 53, and then applied to the next integral circuit 51 and an output of the potential V with a wave form 74 shown in FIG. 8 is obtained.

Supposing, however, that the output signal rectified through the diode 48 has a waveform other than the wave form 73 shown in FIG. 8, for example, a triangular waveform as shown by reference numeral 75 or a noise wave like wave form 76, as shown in FIG. 8, at the time when the output has been passed through the integral circuit 51. The integrated amount is smaller as shown by wave forms 77, 78 and does not reach the prescribed operating potential V of the filter 53. Thus, the mechanical filter 53 can not be operated except by a sine wave, a circular wave or rectangular wave with a fixed frequency and also with a prescribed peak value.

A waveform generated by the action of the mechanical filter 53 output potential V, similar said wave form 74 is sent to the DC amplification circuit 55 after being rectified by the rectifier 54 and the output signal therefrom operates the relay 57 and by closing the makecontact 57′ of the relay 57, the solenoid 60 of the lock operating mechanism 56 as shown by way of an example in FIG. 9 is energized.

In this case, after radiating an electric signal for a fixed period by the delay circuit 58 disposed in the DC amplification circuit 55, the relay 57 will be operated.

The plunger 61 pushes the rod 63, overcoming the repulsion of the spring 64 as the plunger 61 is attracted toward the fixed iron core 62 energized by the solenoid 60. And, when the solenoid 60 is deenergized, the rod 63 is returned while pushing the plunger 61 by the restoring force of the spring 64.

As described hereinbefore, the locking system according to the present invention makes use of an electric signal, so that a number of keys can be obtained by changing combination of frequency, and also, as the mechanical filter circuits 31, 32 are constructed to pass only a narrow range of frequencies necessary for the receiver, adjacent frequencies, that is, different keys can be eliminated perfectly. Furthermore, in the transmitter, there is provided the instantaneous starting circuit 6 consisting of the condenser 3 and the resistors 4, 5 for the mechanical filter 7 of the low frequency oscillation circuit, so that the motivity of the mechanical filter 7 is very favourable, and since the low frequency for interrupting the high frequency oscillation is a rectangular wave in the circuit passing through the diode 19, the transistor 18 and the primary side of coil 21, a specific amount of electric wave energy is generated to which the receiver is responsive, so that even if the receiver receives the same frequency from another transmitter, no operation will be carried out. Therefore the effect as a locking system is very satisfactory.

Furthermore, also in the receiver according to the present invention, as the peak value of the output potential is controlled automatically to a prescribed peak value with the characteristic of the zener diode 44, and after integrating the output by the integral circuit 51, the mechanical filter 53 is operated with the electric potential obtained to actuate the locking mechanism of the next stage. Thus, the receiver will never be affected by noise waves and electric waves sent from other transmitters or the like except the predetermined electric wave energy radiated from the transmitter, whereby the receiver in combination with said transmitter can be safe for perfect locking.

What is claimed is:

1. A locking system using radio waves, comprising:

a transmitting means comprised of a low frequency oscillation circuit including a first mechanical filter circuit and an instantaneous starting circuit coupled to said mechanical filter circuit, said instantaneous starting circuit comprised of a capacitor and two resistors connected, seriatim, in series, the junction of said resistors coupled to the input of said mechanical filter circuit, an amplifying circuit coupled to the the output of said low frequency oscillation circuit, a half-wave rectifying circuit for rectifying a low frequency signal generated by said low frequency oscillation circuit and coupled thereto, means operatively coupled to said half-wave rectifying circuit for producing a rectangular output wave, and high frequency oscillation means operatively coupled to said rectangular output wave means and operated interruptedly by a rectified rectangular wave therefrom; and receiving means for receiving an electric signal transmitted from said transmitting means, said receiving means comprised of a frequency detection circuit having a filter circuit for passing only a narrow range of high frequency and low frequency signals, a second mechanical filter circuit, a peak value forming circuit for amplifying and attenuating a peak value of the detected output from said frequency detection circuit and coupled thereto in order to provide a constant output therefrom, an integral circuit coupled to said frequency detection circuit and second mechanical filter, said integral circuit comprised of a variable resistor and a condensor, said second mechanical filter circuit being responsive only to a predetermined integrated signal derived by said integral circuit from one of a sine wave and a rectangular wave having prescribed frequencies and peak values, a rectifying circuit coupled to said mechanical filter, a DC amplifying circuit, a first input of said DC amplifying circuit coupled to said rectifying circuit and a delay circuit coupled to a second input of said DC amplifying circuit, whereby an output signal for operating a locking mechanism can be obtained.

2. A locking system as claimed in claim 1 wherein after forming the low frequency wave oscillated in said transmitting means into a rectangular wave, a high frequency is adapted to be oscillated interruptedly with said rectangular wave of the low frequency.

* * * * *